United States Patent
Huang et al.

(10) Patent No.: US 10,796,436 B2
(45) Date of Patent: Oct. 6, 2020

(54) INSPECTION APPARATUSES AND METHODS FOR SEGMENTING AN IMAGE OF A VEHICLE

(71) Applicants: Tsinghua University, Beijing (CN); Nuctech Company Limited, Beijing (CN)

(72) Inventors: Chuanhong Huang, Beijing (CN); Qiang Li, Beijing (CN); Jianping Gu, Beijing (CN); Yaohong Liu, Beijing (CN); Ziran Zhao, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 148 days.

(21) Appl. No.: 15/913,222

(22) Filed: Mar. 6, 2018

(65) Prior Publication Data
US 2018/0260959 A1    Sep. 13, 2018

(30) Foreign Application Priority Data
Mar. 8, 2017   (CN) ........................ 2017 1 0135023

(51) Int. Cl.
*G06T 7/143* (2017.01)
*G06T 7/11* (2017.01)
(52) U.S. Cl.
CPC ................ *G06T 7/143* (2017.01); *G06T 7/11* (2017.01); *G06T 2207/10116* (2013.01); *G06T 2207/20081* (2013.01); *G06T 2207/20084* (2013.01); *G06T 2207/30248* (2013.01)

(58) Field of Classification Search
CPC .......... G06T 7/143; G06T 2207/20084; G06T 2207/30248; G06T 7/11; G06T 2207/10116; G06T 2207/20081; G01N 23/10
See application file for complete search history.

(56) References Cited

FOREIGN PATENT DOCUMENTS

| CN | 103886318 A | 6/2014 |
|---|---|---|
| CN | 104616032 A | 5/2015 |
| CN | 106023220 A | 10/2016 |

(Continued)

OTHER PUBLICATIONS

Jaccard, Nicolas, et al. "Tackling the X-ray cargo inspection challenge using machine learning." Anomaly Detection and Imaging with X-Rays (ADIX). vol. 9847. International Society for Optics and Photonics, 2016. (Year: 2016).*

(Continued)

*Primary Examiner* — Menatoallah Youssef
(74) *Attorney, Agent, or Firm* — Schwegman Lundberg & Woessner, P.A.

(57) ABSTRACT

An inspection apparatus and a method for segmenting an Image of a vehicle are disclosed. An X-ray transmission scanning is performed on the vehicle to obtain a transmission image. Each pixel of the transmission image is labeled with a category tag, by using a trained convolutional network. Images of respective parts of the vehicle are determined according to the category tag for each pixel. With the above solutions, it is possible to segment the images of respective parts of a vehicle more accurately in the situations that are complicated or have large variety kinds of vehicles.

9 Claims, 3 Drawing Sheets

(56) References Cited

FOREIGN PATENT DOCUMENTS

JP 2017004350 A 1/2017

OTHER PUBLICATIONS

Long, Jonathan, Evan Shelhamer, and Trevor Darrell. "Fully convolutional networks for semantic segmentation." Proceedings of the IEEE conference on computer vision and pattern recognition. 2015. (Year: 2015).*

Lu, Wenhao, Xiaochen Lian, and Alan Yuille. "Parsing semantic parts of cars using graphical models and segment appearance consistency." arXiv preprint arXiv:1406.2375(2014). (Year: 2014).*

Rapiscan Eagle® R60 Rail Car Cargo Inspection System, product overview white paper, 2010 (Year: 2010).*

"Japanese Application Serial No. 2018-041778, Office Action dated Jan. 18, 2019", w/ English Translation, (dated Jan. 18, 2019), 23 pgs.

"European Application Serial No. 18160385.3 Office Action dated Jul. 26, 2018", (dated Jul. 26, 2018), 10 pgs.

Orphan, Victor J, et al., "Advanced Y ray technology for scanning cargo containers", Applied Radtation and Isotopes63 723-732, (2005), 10 pgs.

Rogers, Thomas W, et al., "Automated X-ray Image Analysis for Cargo Security: Critical Review and Future Promise", Critical Review and Future Promise,arxiv.org, Cornell University Library, 201 Olin Library Cornell University Ithaca, NY 14853, (Aug. 2, 2016), 24 pgs.

"Japanese Appliccation Serial No. 2018-041778, Notification of Refusal dated Nov. 12, 2019", w/ English Translation, (Nov. 12, 2019), 6 pgs.

"Chinese Application No. 201710135023.7, Office Action dated Mar. 4, 2020", w/ English Translation, (dated Mar. 4, 2020), 16 pgs.

"European Application Serial No. 18160385.3, Office Action dated Jan. 30, 2020", (dated Jan. 30, 2020), 6 pgs.

* cited by examiner

INSPECTION APPARATUSES AND METHODS FOR SEGMENTING AN IMAGE OF A VEHICLE

CLAIM FOR PRIORITY

This application claims the benefit of priority of Chinese Application Serial No. 201710135023.7, filed Mar. 8, 2017, which is hereby incorporated by reference in its entirety.

TECHNICAL FIELD

The present disclosure relates to radiation inspection technologies, and in particular to an inspection apparatus and a method for segmenting an image of a vehicle.

BACKGROUND

As the number of vehicles is rapidly increasing, how to inspect a vehicle efficiently and accurately becomes an important issue. The inspection of the vehicle comprise inspecting various parts of the vehicle, such as, inspecting foreign matter in a cargo and classification of the cargo, inspecting wheels or a chassis for entrainment, and the like. These inspections are based on an understanding of the structure of the vehicle. In other words, the inspection apparatus automatically segments different parts of the vehicle on the basis of understanding of each position of the vehicle belonging to which part.

Most of the images processed in the security area are X-ray transmission images. The conventional method for understanding the structure of the vehicle which is used for the X-rays transmission image of the vehicle (such as parsing and the like) is generally based on the rules. However, the effect of the method is significantly degraded in situations that are complicated or have large variety kinds of vehicles.

SUMMARY

In view of one or more of the problems in the related art, an inspection apparatus and a method for segmenting an image of a vehicle are proposed.

According to an aspect of the present disclosure, there is proposed a method for segmenting an image of a vehicle, comprising: performing an X-ray transmission scanning on the vehicle to obtain a transmission image; labeling each pixel of the transmission image with a category tag, by using a trained convolutional network; and determining images of respective parts of the vehicle according to the category tag for each pixel.

According to an embodiment of the present disclosure, the trained convolutional network is obtained by: acquiring X-ray transmission images of a plurality of vehicles as sample images; labeling the sample images pixel by pixel on the respective parts of the vehicle to obtain labeled sample images; and training the convolutional network with the labeled sample images.

According to an embodiment of the present disclosure, the respective parts of the vehicle comprises: wheels, a front, a chassis and a carriage.

According to an embodiment of the present disclosure, the method may further comprise performing at least one of the following operations on the sample images: mirroring, removing image of air, scale transformation and dividing the sample image into sub-images.

According to an embodiment of the present disclosure, the sub-images comprises at least one of an upper left corner, an upper right corner, a lower left corner, a lower right corner, and an intermediate part of the sample images.

According to an embodiment of the present disclosure, the dividing of the sample images comprises: dividing the sample images randomly.

According to an embodiment of the present disclosure, the convolutional network comprises at least one of: a fully convolutional network, a Dilation fully convolutional network, a Deeplab network and a ConvPP network.

According to an aspect of the present disclosure, there is proposed an inspection apparatus, comprising: an X-ray scanning system, configured to perform an X-ray transmission scanning on an inspected vehicle to obtain a transmission image; a memory, configured to store the transmission image; a processor, configured to perform following operations on the transmission image: labeling each pixel of the transmission image with a category tag, by using a trained convolutional network, and determining images of respective parts of the vehicle according to the category tag for each pixel.

According to an embodiment of the present disclosure, the processor is further configured to obtain the trained convolutional network by: acquiring X-ray transmission images of a plurality of vehicles as sample images; labeling the sample images pixel by pixel on the respective parts of the vehicle to obtain labeled sample images; and training the convolutional network with the labeled sample images.

According to an embodiment of the present disclosure, the processor is further configured to perform at least one of the following operations on the sample images: mirroring, removing image of air, scale transformation and dividing the sample image into sub-images.

With the above solutions, it is possible to segment the images of respective parts of a vehicle more accurately in the situations that are complicated or have large variety kinds of vehicles.

BRIEF DESCRIPTION OF THE DRAWINGS

For a better understanding of the present disclosure, the present disclosure will be described in detail according to the following accompanying drawings.

DETAILED DESCRIPTION

Figure 1:
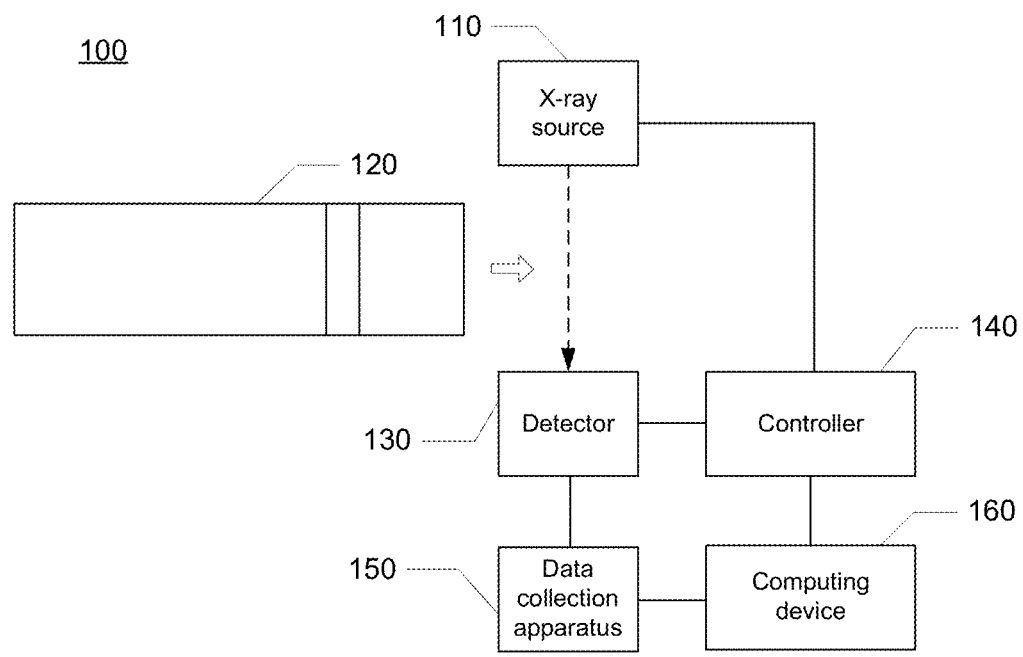
FIG. 1 shows a schematic structural view of an inspection apparatus according to an embodiment of the present disclosure.

The specific embodiments of the present disclosure will be described in detail below. It should be noted that the embodiments herein are used for illustration only, without limiting the present disclosure. In the description below, a number of specific details are explained to provide better understanding of the present disclosure. However, it is apparent to those skilled in the art that the present disclosure can be implemented without these specific details. In other instances, well known structures, materials or methods are not described specifically so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

In view of the prior art, since rule-based methods for understanding the X-ray transmission image of the vehicle have a poor effect in the situations that are complicated or have large variety kinds of vehicles, depth learning methods are used to learn the X-ray transmission image of the vehicle and segment various parts of the vehicle, such as wheels, a front, a chassis, a carriage, and the like. Specifically, a vehicle such as a container truck is subjected to X-ray transmission scanning, so as to obtain a transmission image. Then, each pixel of the transmission image is labeled with a category tag, by using a trained convolutional network, such as a fully convolutional network (FCN). Next, images of respective parts of the vehicle are determined according to the category tag for each pixel. Through the above method, for example, applying a GPU into the deep learning method, compared with the conventional machine learning method which requires extracting features manually, the deep learning methods can achieve an intelligent classification, an inspection and a semantic segmentation with a high accuracy by using the features obtained from the learning.

Specifically, existing methods of understanding a car body used for a X-ray transmission image of a vehicle are based on rules, however, it is difficult for human beings to exhaust all the rules. In contrast, an end-to-end deep learning method is focused on incorporating feature extraction and pixel classification together. Under the conditions of training with numbers of samples, it is common to let a machine learn the features by itself, enhancing the generalization ability. As a result, it is more effective in situations that are complicated or have large variety kinds of vehicles. In specific applications, segmented different portions of images can be used for subsequent smart inspection. The above solution is beneficial to achieve an intelligent inspection of the vehicle to some extent, thereby contributing to inspecting the vehicle efficiently and safely.

FIG. 1 illustrates a structural diagram of an inspection apparatus according to an embodiment of the present disclosure. As shown in FIG. 1, an inspection apparatus 100 according to an embodiment of the present disclosure comprises an X-ray source 110, a detector 130, a data collection apparatus 150, a controller 140, and a computing device 160, and performs security inspection on an inspected object 120 such as a container truck etc., for example, judges whether there are dangerous articles and/or suspicious articles such as firearms included therein. Although the detector 130 and the data collection apparatus 150 are separately described in this embodiment, it should be understood by those skilled in the art that they may also be integrated together as an X-ray detection and data collection device.

According to some embodiments, the X-ray source 110 may be an isotope, or may also be an X-ray machine, an accelerator, etc. The X-ray source 110 may be a single-energy ray source or a dual-energy ray source. In this way, transmission scanning is performed on the inspected object 120 through the X-ray source 110, the detector 150, the controller 140, and the computing device 160 to obtain detection data. For example, in a process that the inspected object 120 moves, an operator controls the controller 140 to transmit an instruction through a man-machine interface of the computing device 160 to instruct the X-ray source 110 to emit rays, which are transmitted through the inspected object 120 and are then received by the detector 130 and the data collection device 150. Further, data is processed by the computing device 160 to obtain a transmission image, further the transmission image of the vehicle is segmented using a trained convolutional network, so as to obtain images corresponding to respective parts of the vehicle, facilitating the subsequent inspection for hazardous article or suspicious objects. In this way, it is convenient for the inspector to find dangerous goods/suspicious objects when the locations of the suspicious objects in the container or on the vehicle body are determined, for example by comparing eigenvalues, such as atomic numbers. In addition, it may be further determined that whether or not there is an entrainment in a certain part of the vehicle, based on a difference between the image of the vehicle including the entrainment and the images of respective parts of the vehicle that does not contain the object.

Figure 2:
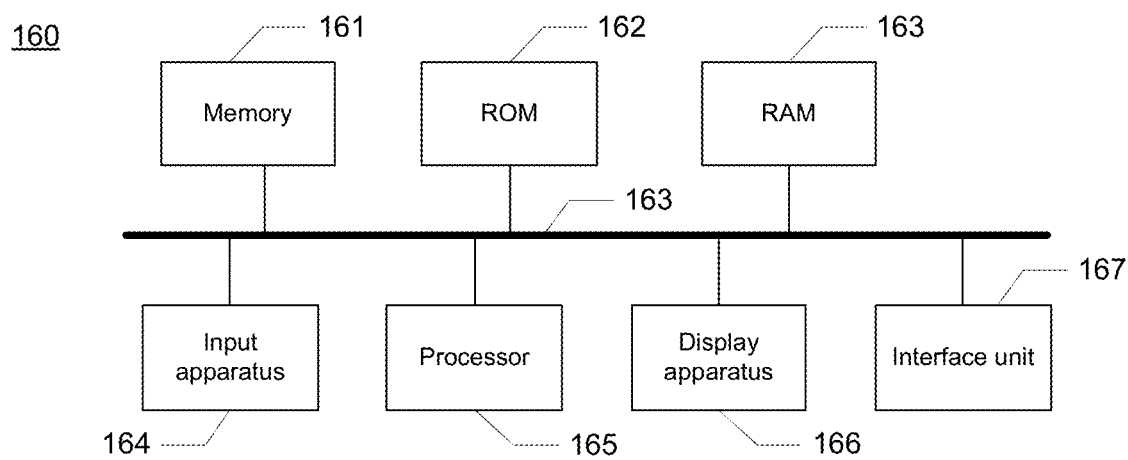
FIG. 2 shows a schematic diagram illustrating the structure of a computing device included in the inspection apparatus as described in FIG. 1.

FIG. 2 illustrates a structural diagram of the computing device illustrated in FIG. 1. As shown in FIG. 2, a signal detected by the detector 130 is collected by a data collector, and data is stored in a memory 161 through an interface unit 167 and a bus 163. A read only memory (ROM) 162 stores configuration information and programs of a computer data processor. A Random Access Memory (RAM) 163 is configured to temporarily store various data when a processor 165 is in operation. In addition, computer programs for performing data processing, such as an artificial neural network program, a substance recognition program and an image processing program etc., are also stored in the memory 161. The internal bus 163 connects the memory 161, the ROM 162, the RAM 163, an input apparatus 164, the processor 165, a display apparatus 166, and the interface unit 167 described above.

After a user inputs an operation command through the input apparatus 164 such as a keyboard and a mouse etc., instruction codes of a computer program instruct the processor 165 to perform a predetermined data processing algorithm. After a result of the data processing is acquired, the result is displayed on the display apparatus 166 such as a Liquid Crystal Display (LCD) display etc. or is directly output in a form of hard copy such as printing etc.

Before obtaining a fully convolutional network, a database which comprises a plurality of samples should be established. After then, the fully convolutional network can be trained with the samples. For example, in an embodiment of the present disclosure, at first, a large number of known transmission images of vehicle bodies are manually labeled pixel by pixel and then numbers of samples are trained with a depth-based vehicle body understanding method.

In particular, labeling the large number of known transmission images of vehicle bodies pixel by pixel may include: (1) determining which parts are included in the transmission images of vehicle bodies; (2) extracting a large number of images from the transmission images of vehicle bodies; (3) labeling each pixel of the extracted transmission image with a category which it belongs to manually, so as to obtain a label map having the same size as the original transmission image; (4) saving the labeled label map and the original transmission images as training samples.

When obtaining a fully convolutional network, a large number of samples can be trained end-to-end with a deep learning based method for vehicle body understanding, wherein the deep learning method is based on a fully convolutional network (FCN), which may have some improved network structure.

Specifically, FCN is a Convolutional Neural Network (CNN) model used for semantic segmentation, which is a network structure obtained by reinterpreting the fully connected layers of classified CNN networks as convolution layers, which enable the input image for the network having an arbitrary size, and finally recover predicted results to the original image size by up-sampling.

In addition, in view of the FCN, an improved FCN (that is, a Dilation FCN) can also be used, which changes a stride of the last two of pooling layers in FCN from 2 to 1, and then makes the receptive field of the output layer invariant by adding holes to the convolution kernel. Furthermore, different rates are set to achieve multi-scale purpose.

In addition, the Dilation FCN can also be improved by: passing the image through the trained Dilation FCN network, so as to obtain a probability distribution for the category of each pixel; and optimizing the a probability distribution for the category of each pixel with a conditional random field (CRF) with reference to the information on the image, so as to obtain a predicted label map with higher resolution. The method of incorporating the Dilation FCN with the CRF is called DeepLab. The CRF in DeepLab can be interpreted as a circular neural network (RNN) by itself. A benefit of interpreting the CRF as RNN is in that some of the weighting parameters in CRFs can be learned through RNN.

According to some embodiments, it is also possible to use a ConvPP network, which uses the label itself to train a particular convolutional network. In this manner, each pixel is classified by utilizing the features trained by this particular convolutional network in combination with the features previously trained by the FCN, which has a better result than the FCN.

In some embodiments of the present disclosure, the above convolutional network is trained with a large number of samples. In other embodiments, a small number of samples may also be used to achieve similar results as the above method, such as the Low Shot network.

Figure 3:
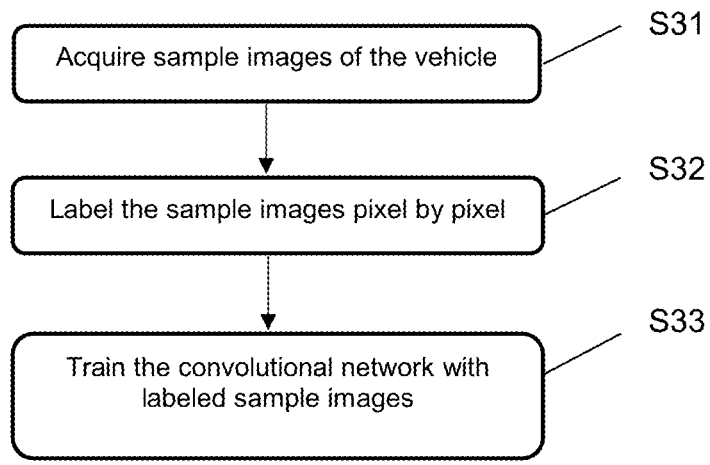
FIG. 3 shows a schematic diagram illustrating a process of training a convolutional network in accordance with an embodiment of the present disclosure.

FIG. 3 shows a schematic diagram illustrating a process of training a convolutional network in accordance with an embodiment of the present disclosure. As shown in FIG. 3, at step S310, a transmission image of a vehicle, such as a container truck, is obtained as a sample image. Then, at step S320, the sample image is labeled pixel by pixel manually. For example, the labeling may comprise: determining which categories are included in the transmission image of the vehicle, extracting a large number of images from the sample image, labeling the large number of images manually and saving the images as samples.

Specifically, in practice, the transmission image of the vehicle can be divided into six categories: air, cargo, container, contours, a chassis, a front and wheels. The air should have been divided into the air inside the compartment and the air outside the compartment, but for the sake of simplicity, they were labeled as air collectively.

Then, the same amount of images may be randomly extracted from different vehicle models. The more the samples and the larger the numbers, the stronger the generalization ability will be, and the less trained samples will lead to over-fitting.

Next, each pixel of the extracted transmission image is labeled with its category manually, so as to obtain a label map having the same size with the original transmission image. If the height and width of the original transmission image are H and W respectively, the height and width of the label map are also H and W respectively, where the value of each pixel has a range of $\{0, 1, 2, 3, 4, 5\}$ representing for the category which the pixel corresponding to the pixel in the original picture should belong to, among the six categories.

Finally, the labeled label map and the original transmission image are saved and used as training samples. In some embodiments, the number of samples can be increased/the calculation process can speed up as follows.

Mirroring operation: in order to increase the amount of the samples, the image of the sample can be mirrored, which will double the amount of the samples.

Removing image of air: in order to improve efficiency, the part of the air around the image is removed by using the label map, resulting in a relatively small image, which can speed up the training.

Scale transformation: if the computing resources are insufficient or it is to improve the efficiency, the sample image can be reduced to a certain scale, for example, to ⅕ of the original scale.

The amount of the training sample can also be increased by dividing the sample image into sub-images.

In addition, an upper left corner, an upper right corner, a lower left corner, a lower right corner and an intermediate part of the sample images can be selected to cut off, wherein the area of each part may occupy about 70% of the original image. By taking the original image into account, the amount of the samples is increased by 5 times. Alternatively, the image can also be divided randomly. If it is desired to increase the amount of the samples by N times, each image can be randomly cut N times, and then the original image is added.

According to other embodiments of the present disclosure, the step of dividing an image may also be performed on the data layer when training the network, so that the hard disk used for storing the divided picture can be saved.

At step S330, a convolutional network is trained by using the labeled sample images. For example, a large number of samples are trained end-to-end by using the depth-based vehicle body understanding method.

FCN-Based Training

FCN is obtained by reinterpreting the fully connected layer of the classification network as a convolutional layer. After the reinterpretion, the input image is allowed to be arbitrary size. Taking a VGG network as an example, any image may have its length and width reduced to 1/32 of the original image after passing a FCN version of VGG network, so as to obtain a reduced image. The reduced image is provided with a de-convolution layer, and then up-sampled to the original image size. Since the original image is firstly down-sampled 32 times and then up-sampled to the original image size, lots of details of the original image are lost. In view of this, the features of pool4 and pool5 layers can also be used for classification, so as to improve the image resolution.

DeepLab-Based Training

Firstly, the Dilation FCN should be trained. There are several optional network structures for Dilation FCN: V1, LargeFOV, MSc-LargeFOV, ASPP and Res101.

The basic network for V1, LargeFOV, MSc-LargeFOV and ASPP is VGG. For a FCN version of VGG network, the stride of pool4 and pool5 layers is changed from 2 to 1, and the convolution kernel for convolutional layer between pool4 and pool5 layers has a rate set to 2. Based on this, V1 sets the rate of the convolution kernel for the convolution layer after pool5 layer to 4, so that the output layer maintains the same receptive field as the original FCN. In view of the fact that a larger receptive field helps in identifying a larger object, LargeFOV may set the rate of the convolution kernel for the convolutional layer after pool5 layer to be even larger, for example, 12. MSc-LargeFOV is based on Large-FOV, which enables the features of an underlying layer involving in the final pixel classification. ASPP considers the multi-scale problem, thus it divides into 4 branches after pool5 layer. The convolution kernels of convolution layers in respective branches have different rates. For example, the rate of the first branch=6, the rate of the second branch=12, the rate of the third branch=18, the rate of the fourth branch=24, which makes each pixel of the last output layer has a receptive field of four scales.

Res101 is obtained by modifying a classification ResNet with 101 layers, and the modification method is similar with the VGG.

The network is trained with a depth learning frame caffe. The training may have two stages: at the first stage, with respect to each iteration, a sub-image having a fixed length and width is divided from the input image and used for training; at the second stage, the parameters obtained in the first stage are tuned finely, and with respect to each iteration, an image is input for training.

Subsequently, the CRF is trained. Although the Dilation FCN works better than the original FCN, since the output layer is actually down-sampled eight times, the resultant label map having the same size as the original image which is obtained by up-sampling eight times may have a relatively low resolution. In order to increase the resolution, CRF can be performed after the Dilation FCN. There are two ways to perform the CRF: (1) CRF is performed independently from training samples. In other words, CRF is not involved in the training. The CRF parameters are obtained by cross-validation. In predicting, the image is passed through a trained Dilation FCN network firstly, so as to obtain a category probability distribution. Then, the obtained category probability distribution is combined with the information of the original image, so as to iteratively obtain a more accurate category probability distribution. (2) CRF-involved training: the CRF is interpreted as a RNN, which is connected to the Dilation FCN, so that it can be trained end-to-end, wherein the CRF parameters can be obtained by training.

Figure 4:
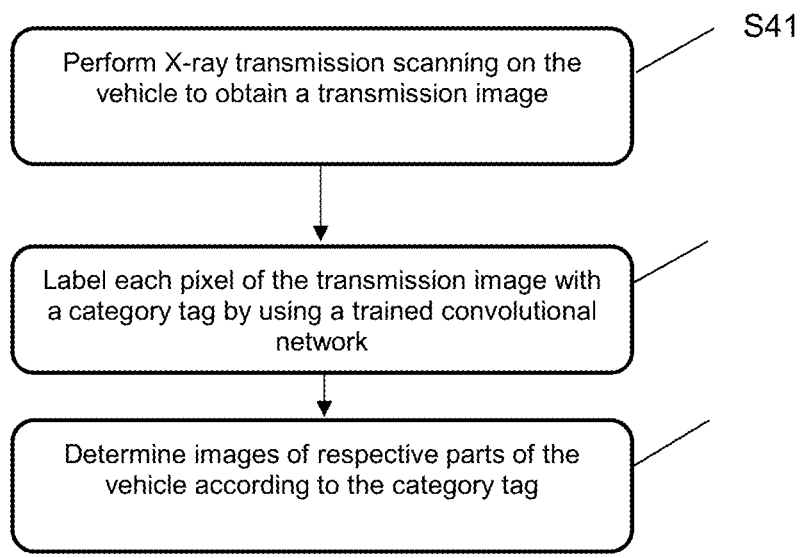
FIG. 4 shows a schematic diagram illustrating a process of segmenting an image of a vehicle according to an embodiment of the present disclosure.

FIG. 4 shows a schematic diagram illustrating a process of segmenting an image of a vehicle according to an embodiment of the present disclosure. As shown in FIG. 4, at step S410, an X-ray scanning is performed on a vehicle to be inspected by the system shown in FIG. 1, so as to obtain a transmission image. Here, it is also allowable to perform operations such as air-handling, noise reduction and normalization on the transmission image.

At step S420, the pixels of the transmission image are labeled with a category tag by using the trained convolutional network. For example, the transmission image is input into the trained convolutional network, to obtain a category tap of each pixel in the image. For example, pixels corresponding to different parts of the vehicle body are labeled correspondingly, for example, 1 corresponds to wheels, 2 corresponds to a front, 3 corresponds to a chassis, and 4 corresponds to a carriage.

At step S430, images of various parts of the vehicle are determined according to the category tags of the pixels of the vehicle. For example, pixels with different labels may be drawn with different colors, or different vehicle body parts may be surrounded by a closed curve to indicate the recognized vehicle body part, so as to facilitate subsequent inspection of dangerous goods/suspicious objects. In this way, it is convenient for the inspector to find dangerous goods/suspicious objects when the locations of the dangerous goods/suspicious objects in the container or on the vehicle body are determined, for example by comparing eigenvalues, such as atomic numbers. In addition, it may be further determined that whether or not there is an entrainment in a certain part of the vehicle, based on a difference between the image of the vehicle including the entrainment and the images of respective parts of the vehicle that does not contain the object.

Figure 5:
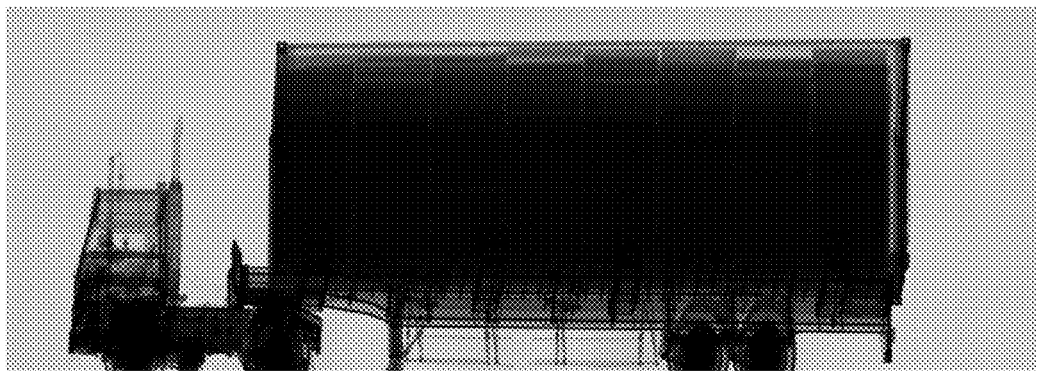
FIG. 5 shows a schematic diagram illustrating a transmission image of a vehicle according to an embodiment of the present disclosure.
Figure 6:
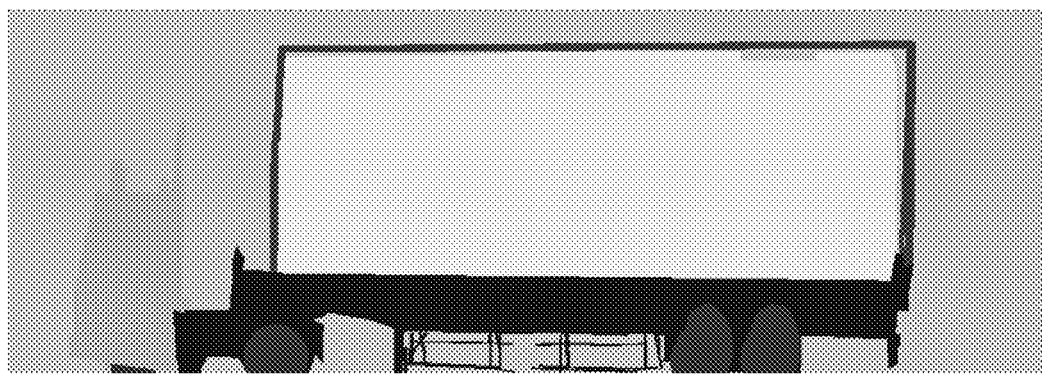
FIG. 6 shows a schematic diagram of segmented images of respective parts of a vehicle according to an embodiment of the present disclosure.

FIG. 5 shows a schematic diagram illustrating a transmission image of a vehicle according to an embodiment of the present disclosure. FIG. 6 shows a schematic diagram of segmented images of respective parts of a vehicle according to an embodiment of the present disclosure. As shown in FIG. 6, the image of the vehicle body is divided into parts such as wheels, a front, a chassis, and a carriage, by understanding the transmission image of the inspected vehicle. In addition, it is also possible to give different colors to the pixels on the different parts of the vehicle body on demand, or to enclose different parts of the vehicle body with a closed curve to indicate a recognized vehicle body part.

According to the above embodiments, in a case that the network is trained with a large number of samples, it is common to let a machine learn the features by itself, enhancing the generalization ability. As a result, it is more effective in situations that are complicated or have large variety kinds of vehicles. In specific applications, segmented different portions of images can be used for subsequent smart inspection. The above solution is beneficial to achieve an intelligent inspection of the vehicle to some extent, thereby contributing to inspecting the vehicle efficiently and safely.

The foregoing detailed description has set forth various embodiments of the inspection apparatus and the method for detecting a firearm via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached

We claim:

1. An inspection apparatus, comprising:
    an X-ray scanning system, configured to perform an X-ray transmission scanning on an inspected vehicle to obtain a transmission image of the vehicle;
    a memory, configured to store the transmission image;
    a processor, configured to perform following operations on the transmission image:
    removing an air part of the transmission image to obtain a processed transmission image;
    labeling each pixel of the processed transmission image with a category tag respectively, by using a trained convolutional neural network; and
    determining images of respective parts of the vehicle according to the category tag for each pixel to segment the transmission image of the vehicle;
    wherein the processor is further configured to obtain the trained convolutional neural network by:
    acquiring X-ray transmission images of a plurality of vehicles as sample images;
    labeling the sample images pixel-by-pixel on the respective parts of the vehicle to obtain labeled sample images, wherein the respective parts of the vehicle at least comprises the air part;
    removing the air part of each of the labeled sample images according to the labeled pixels to obtain trained images; and
    training a convolutional neural network by using the trained images.

2. The inspection apparatus of claim 1, wherein the respective parts of the vehicle comprises: wheels, a front, a chassis and a carriage.

3. The inspection apparatus of claim 1, wherein the processor is further configured to perform at least one of the following operations on the sample images:
    mirroring, scale transformation and dividing the sample image into sub-images.

4. A method for segmenting an image of a vehicle, comprising:
    performing an X-ray transmission scanning on the vehicle to obtain a transmission image of the vehicle, wherein the vehicle comprises a plurality of parts;
    removing an air part of the transmission image to obtain a processed transmission image;
    labeling each pixel of the processed transmission image with a category tag respectively, by using a trained convolutional neural network; and
    determining images of respective parts of the vehicle according to the category tag for each pixel to segment the transmission image of the vehicle;
    wherein the processor is further configured to obtain the trained convolutional neural network by:
    acquiring X-ray transmission images of a plurality of vehicles as sample images;
    labeling the sample images pixel-by-pixel on the respective parts of the vehicle to obtain labeled sample images, wherein the respective parts of the vehicle at least comprises the air part;
    removing the air part of each of the labeled sample images according to the labeled pixels to obtain trained images; and
    training a convolutional neural network by using the trained images.

5. The method of claim 4, wherein the respective parts of the vehicle further comprises: wheels, a front, a chassis and a carriage.

6. The method of claim 4, further comprising performing at least one of the following operations on the sample images:
    mirroring, scale transformation and dividing the sample image into sub-images.

7. The method of claim 6, wherein the sub-images comprises at least one of an upper left corner, an upper right corner, a lower left corner, a lower right corner, and an intermediate part of the sample images.

8. The method of claim 6, wherein the dividing of the sample images comprises:
    dividing the sample images randomly.

9. The method of claim 4, wherein the convolutional network comprises at least one of:
    a fully convolutional network, a Dilation fully convolutional network, a Deeplab network and a ConvPP network.

* * * * *